US011208288B2

(12) United States Patent
Arimachi et al.

(10) Patent No.: US 11,208,288 B2
(45) Date of Patent: Dec. 28, 2021

(54) VANE MEMBER FOR PAPER SHEET CONVEYANCE IMPELLER

(71) Applicant: Mitsuboshi Belting Ltd., Kobe (JP)

(72) Inventors: Kentaro Arimachi, Hyogo (JP); Akira Takenaka, Hyogo (JP); Takahide Okazawa, Hyogo (JP)

(73) Assignee: Mitsuboshi Belting Ltd., Kobe (JP)

(*) Notice: Subject to any disclaimer, the term of this patent is extended or adjusted under 35 U.S.C. 154(b) by 339 days.

(21) Appl. No.: 16/464,822

(22) PCT Filed: Nov. 30, 2017

(86) PCT No.: PCT/JP2017/043099
§ 371 (c)(1),
(2) Date: May 29, 2019

(87) PCT Pub. No.: WO2018/101415
PCT Pub. Date: Jun. 7, 2018

(65) Prior Publication Data
US 2019/0291999 A1  Sep. 26, 2019

(30) Foreign Application Priority Data

Nov. 30, 2016 (JP) .............................. JP2016-232864
Nov. 27, 2017 (JP) .............................. JP2017-226925

(51) Int. Cl.
B65H 29/40 (2006.01)
C08J 5/04 (2006.01)
(Continued)

(52) U.S. Cl.
CPC ........... B65H 29/40 (2013.01); B29C 39/026 (2013.01); C08J 5/04 (2013.01); G07D 9/00 (2013.01)

(58) Field of Classification Search
CPC ......... B65H 29/40; B29C 39/026; C08J 5/04; C07D 9/00
See application file for complete search history.

(56) References Cited

U.S. PATENT DOCUMENTS 5,857,393 A    1/1999 Kohiyama
2004/0135304 A1    7/2004 Tokunaga et al.
(Continued)

FOREIGN PATENT DOCUMENTS

CN     105683069 A    6/2016
JP     H11-292378 A   10/1999
(Continued)

OTHER PUBLICATIONS

Jun. 1, 2021—(JP) Notification of Reasons for Refusal—App 2017-226925 (Appeal 2020-8074), Eng Tran.
(Continued)

Primary Examiner — Laura A Gudorf
(74) Attorney, Agent, or Firm — Banner & Witcoff, Ltd.

(57) ABSTRACT

The present invention relates to a vane member for a paper sheet conveyance impeller, which includes a rotatable cylindrical member, the vane member being provided with: a vane member body comprising a thermosetting polyurethane elastomer; and a plurality of core wires which comprise polyester fibers and are arranged along the axial direction of a rotary shaft of the cylindrical member. At least a portion of the core wires is embedded within the vane member body. The vane member may be disposed so as to protrude from the external peripheral surface of the rotatable cylindrical member.

9 Claims, 6 Drawing Sheets

(51) Int. Cl.
    *G07D 9/00*     (2006.01)
    *B29C 39/02*    (2006.01)

(56) References Cited

U.S. PATENT DOCUMENTS

| | | |
|---|---|---|
| 2016/0130098 A1 | 5/2016 | Yoshida et al. |
| 2017/0016428 A1 | 1/2017 | Altmikus et al. |
| 2018/0346668 A1 | 12/2018 | Ichikawa et al. |

FOREIGN PATENT DOCUMENTS

| | | |
|---|---|---|
| JP | 2011-079985 A | 4/2011 |
| JP | 2013-155032 A | 8/2013 |
| JP | 2015-027899 A | 2/2015 |
| JP | 2015-205771 A | 11/2015 |
| TW | I239317 B | 9/2005 |
| TW | M310122 U | 4/2007 |
| TW | 201538845 A | 10/2015 |
| TW | 201634782 A | 10/2016 |

OTHER PUBLICATIONS

Feb. 4, 2021—(CN) Notification of the Third Office Action—App 201780073571.X, Eng Tran.
Jan. 19, 2021—(CA) Office Action—U.S. Pat. No. 3,044,655.
Mar. 2, 2020—(CN) Notification of First Office Action—App 201780073571.X, Eng Tran.
May 28, 2020—(KR) Office Action—App 10-2019-7015207, Eng Tran.
Feb. 13, 2018—International Search Report—Intl App PCT/JP2017/043099.
Feb. 23, 2019—(TW) Office Action—App 106141920.
Aug. 6, 2019—(JP) Notification of Reasons for Refusal—App 2017-226925.
Aug. 26, 2019—(TW) Decision of the IPO—App 106141920.
Mar. 31, 2020—(JP) Decision of Refusal—App 2017-226925, Eng Tran.
Oct. 5, 2020—(KR) Office Action—App 10-2019-7015207, Eng Tran.
Jun. 18, 2020—(CA) Office Action—App 3,044,655.
Aug. 5, 2020—(CN) Notification of the Second Office Action—App 201780073571.X, Eng Tran.
Aug. 20, 2021—(CA) Office Action—App 3,044,655.

[Fig. 1]
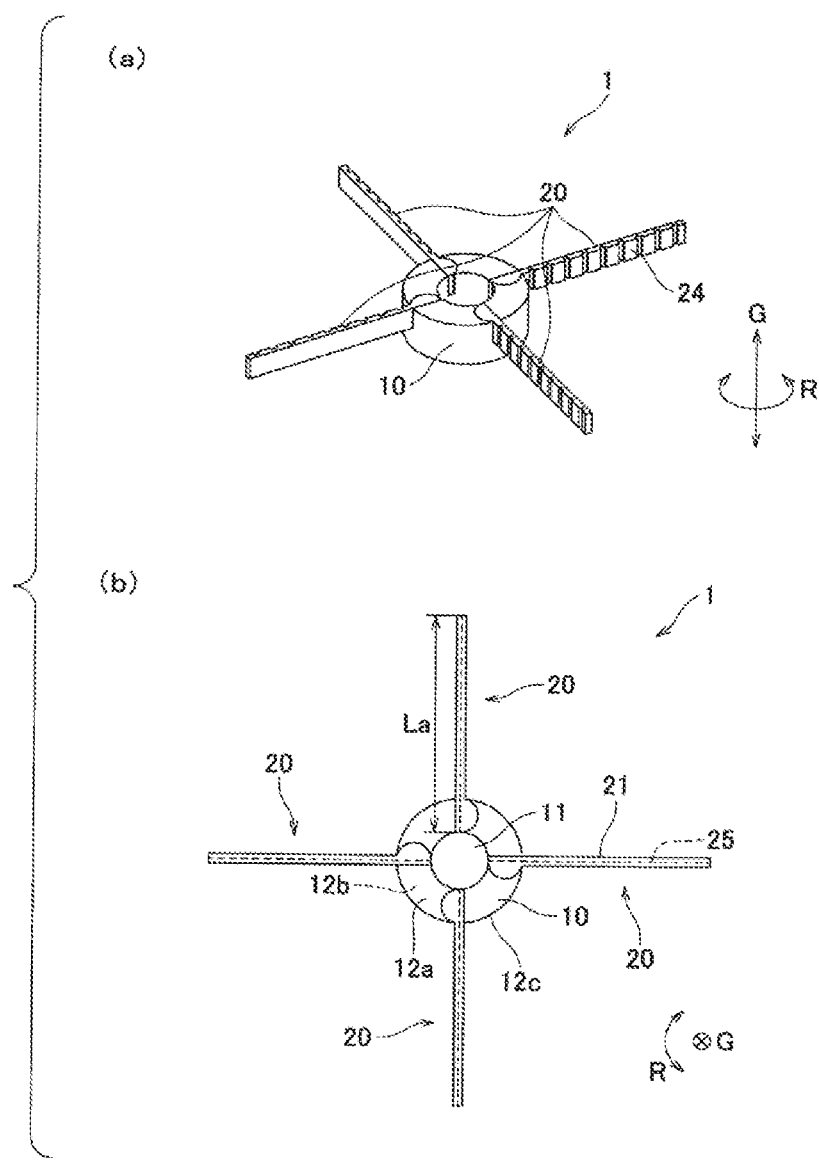

[Fig. 2]
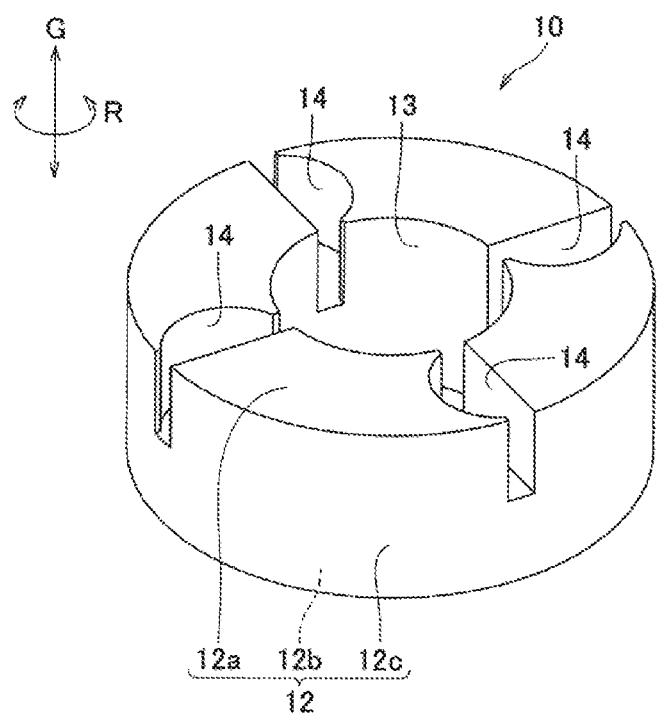

[Fig. 3]
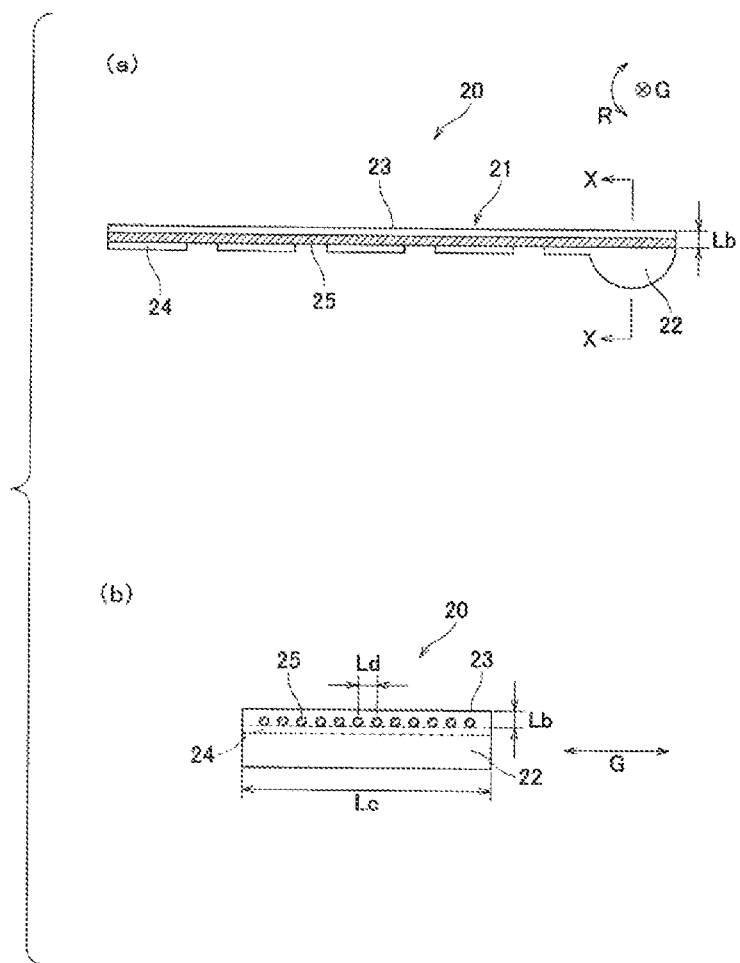

[Fig. 4]
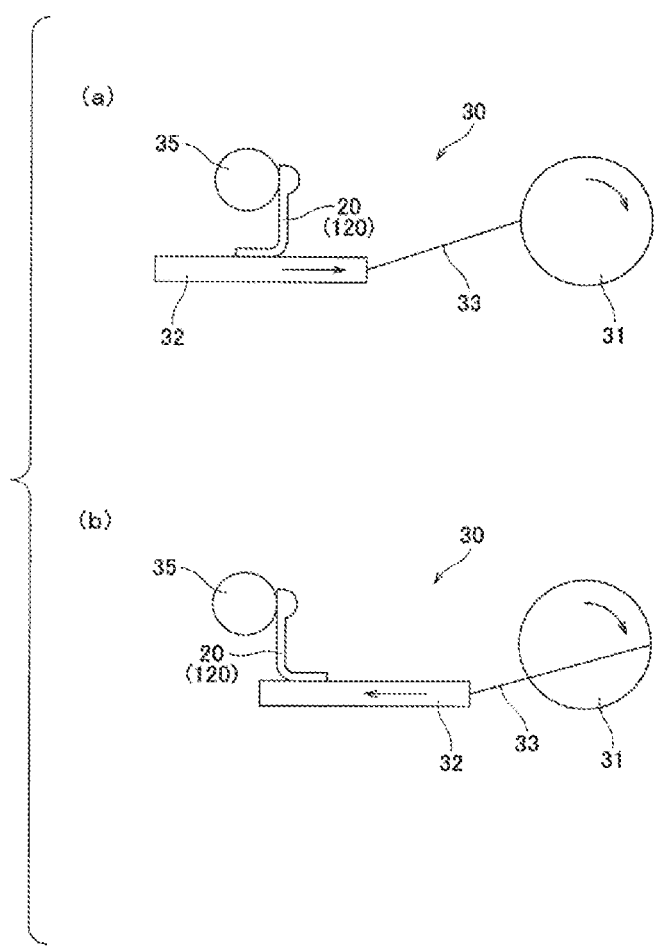

[Fig. 5]
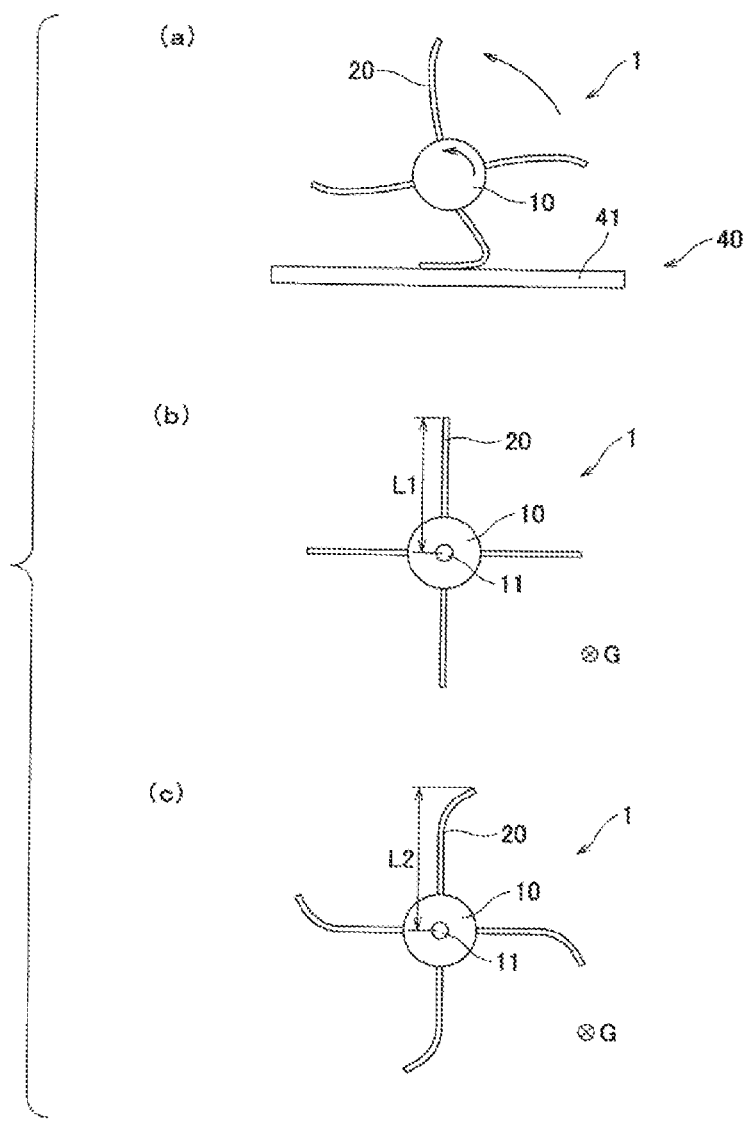

[Fig. 6]
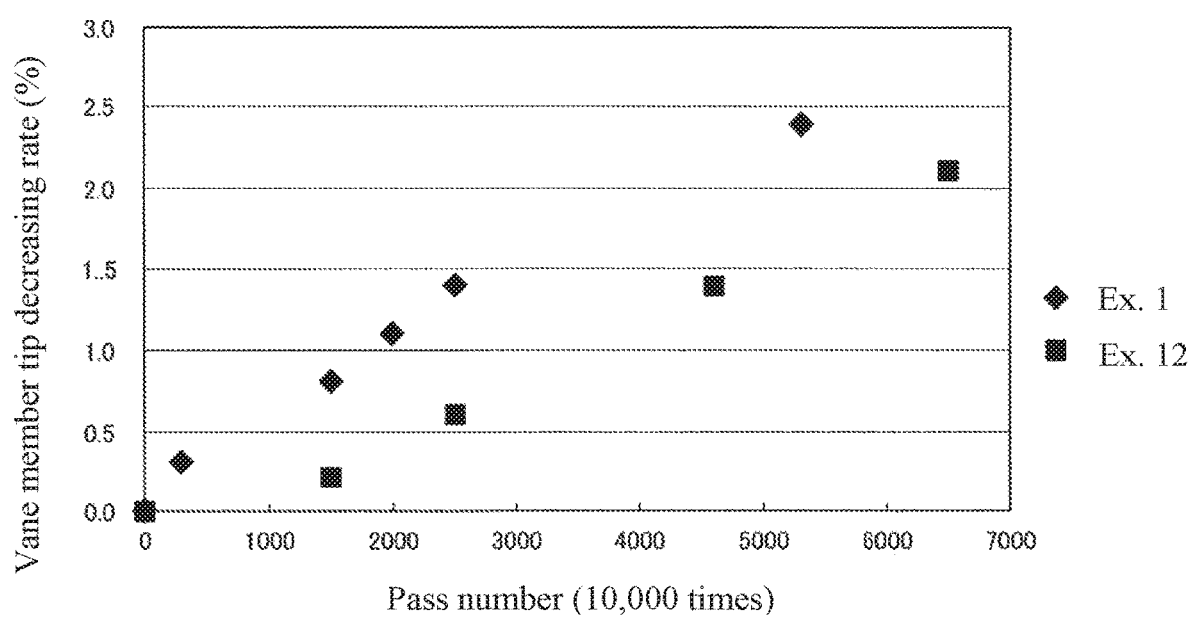

VANE MEMBER FOR PAPER SHEET CONVEYANCE IMPELLER

CROSS REFERENCE TO RELATED APPLICATIONS

This is a U.S. National Phase Application under 35 U.S.C. § 371 of International Application No. PCT/JP2017/043099, filed Nov. 30, 2017, which claims priority to Japanese Application Nos. 2016-232864, filed Nov. 30, 2016 and 2017-226925, filed Nov. 27, 2017, which was published Under PCT Article 21(2), the entire contents of which are incorporated herein by reference.

TECHNICAL FIELD

The present invention relates to a vane member for a paper sheet-conveyance impeller used for conveying paper sheets.

BACKGROUND ART

A conveyance device for conveying paper sheets such as paper moneys, magnetic cards and tickets is installed in automatic ticket gates, automatic register change machines, money changing machines, automatic ticket vending machines, and the like. A paper sheet-conveyance impeller for conveying paper sheets is used in the conveyance device. The paper sheet-conveyance impeller is constituted such that a plurality of vane members are radially attached in a radial direction orthogonal to a rotating shaft of a rotatable cylindrical member. The paper sheet-conveyance impeller rotates vane members at high speed and brings them into contact with paper sheets, thereby conveying paper sheets by frictional force when contacting.

Since the vane member is brought into contact with paper sheets, plastic deformation is generated due to long-term use and damages such as abrasion, breakage and crack occur. When plastic deformation is generated, the vane member is not sufficiently brought into contact with paper sheets, leading to a cause for conveyance miss and the like. In view of the problem, a structure that the vane member is made to be detachably attached to a cylindrical member, thereby making it possible to replace the vane member, is proposed. In other words, the vane member is required to suppress plastic deformation and enhance bending durability.

In view of the above, Patent Document 1 proposes a vane member using a thermosetting urethane formed by casting and an aramid twisted yarn as a core wire in order to suppress thermoplastic deformation of a vane member and enhance bending durability thereof. Patent Document 2 proposes a vane member using a thermosetting polyurethane and a core wire including nylon. However, bending durability was not sufficiently satisfied even in the vane members described in Patent Documents 1 and 2. To suppress plastic deformation of the vane member, flexibility capable of bending is required while enhancing bending durability and maintaining strength. Specifically, the vane member should be difficult to cause plastic deformation, that is, restorability capable of returning to the original shape is required while enhancing bending durability.

PRIOR ART DOCUMENT

Patent Document

Patent Document 1: JP-A-2013-155032
Patent Document 2: JP-A-2015-205771

SUMMARY OF THE INVENTION

Problems that the Invention is to Solve

The present invention is to solve the problems described above and has an object to provide a vane member for a paper sheet-conveyance impeller that suppresses plastic deformation and enhances bending durability and restorability.

Means for Solving the Problems

To solve the above problems, the vane member for a paper sheet-conveyance impeller according to the preset invention is a vane member for a paper sheet-conveyance impeller, which includes a rotatable cylindrical member, the vane member including: a vane member body including a thermosetting polyurethane elastomer; and a plurality of core wires being arranged side by side in a shaft direction of a rotating shaft of the cylindrical member and each including a polyester fiber, in which at least a part of the core wire is embedded inside the vane member body.

In this constitution, at least one vane member for a paper sheet-conveyance impeller is arranged so as to protrude from an outer peripheral surface of the rotatable cylindrical member. The vane member for a paper sheet-conveyance impeller may be brought into contact with paper sheets to convey those. The vane member for a paper sheet-conveyance impeller includes the vane member body and the core wire. The vane member body includes a thermosetting polyurethane elastomer. The core wire includes a polyester fiber. At least a part of the core wire is embedded inside the vane member body. A plurality of the core wires are arranged side by side in the shaft direction of the rotating shaft of the cylindrical member.

Elastomer materials having excellent elasticity are preferable for the vane member body from the standpoint of restorability. Of the elastomer materials, a thermosetting polyurethane elastomer has particularly excellent abrasion resistance and elasticity. The polyester fiber constituting the core wire has excellent heat resistance and strength. From the standpoint of bending durability, a polyester fiber, an aramid fiber and a nylon fiber are preferred for the core wire, and a polyester fiber that is difficult to buckle against plastic deformation is particularly suitable. In the case where the vane member body includes a thermosetting polyurethane elastomer and the core wire includes a polyester fiber, deformation force (compressive force) generated inside the core wire when bending can be reduced and bending durability and restorability of the vane member are enhanced. Specifically, the vane member for a paper sheet-conveyance impeller of the present invention can suppress plastic deformation and enhance bending durability and restorability.

According to another standpoint, the vane member for a paper sheet-conveyance impeller of the present invention preferably has the following constitution.

The fineness of the core wire is in a range of 100 to 300 deniers. Alternatively, the fineness of the core wire is in a range of 120 to 180 deniers.

In this constitution, the fineness of the core wire is preferably in a range of 100 to 300 deniers. The diameter of the core wire (core wire diameter) is preferably in a range of 0.10 to 0.19 mm. Furthermore, the fineness of the core wire is more preferably in a range of 120 to 180 deniers. In other words, the diameter of the core wire is relatively small. In the case where the diameter of the core wire is large, deformation force (compressive force) inside the core wire (particularly, a vicinity of an outer periphery of a paper sheet-conveyance impeller) is increased when bending as compared with the case where the diameter of the core wire is small, and buckling and breakage are easy to occur. Therefore, by making the diameter of the core wire relatively small, the deformation force (compressive force) generated inside the core wire when bending can be reduced and bending durability is improved. In other words, the vane member for a paper sheet-conveyance impeller of this constitution can suppress plastic deformation and further enhance bending durability and restorability.

According to another standpoint, the vane member for a paper sheet-conveyance impeller of the present invention preferably has the following constitution.

The vane member body includes the thermosetting polyurethane elastomer containing no plasticizer.

Alternatively, the vane member body includes the thermosetting polyurethane elastomer containing a plasticizer, and the plasticizer is contained in an amount of 20 parts by mass or less per 100 parts by weight of the thermosetting polyurethane elastomer. Alternatively, the vane member body includes the thermosetting polyurethane elastomer containing a plasticizer, and the plasticizer is contained in an amount of 5 parts by mass or less per 100 parts by weight of the thermosetting polyurethane elastomer.

In this constitution, it is preferred that the vane member body includes a thermosetting polyurethane elastomer containing a plasticizer, and the plasticizer is contained in an amount of 20 parts by mass or less per 100 parts by weight of the thermosetting polyurethane elastomer. Furthermore, it is more preferred that the vane member body includes a thermosetting polyurethane elastomer containing a plasticizer, and the plasticizer is contained in an amount of 5 parts by mass or less per 100 parts by weight of the thermosetting polyurethane elastomer. The vane member body more preferably includes a thermosetting polyurethane elastomer containing no plasticizer. In the case where a large amount of the plasticizer is contained in the vane member body, the plasticizer bleeds out in the course of repeated contact of the vane member body with paper sheets in long-term use, and transfers on the surfaces of paper sheets. As a result, the vane member body contacting paper sheets plastically deforms and warpage of the vane member occurs. Therefore, in the case where the amount of the plasticizer contained in the vane member body is decreased or the vane member body does not contain the plasticizer, the warpage of the vane member is relatively reduced and restoring force is improved. In other words, the vane member for a paper sheet-conveyance impeller of this constitution can suppress plastic deformation and further enhance bending durability and restorability.

According to another standpoint, the vane member for a paper sheet-conveyance impeller of the present invention preferably has the following constitution.

The plurality of the core wires are arranged side by side in the shaft direction of the rotating shaft with an interval between the adjacent core wires being in a range of 0.25 to 0.50 mm. Alternatively, the plurality of the core wires are arranged side by side in the shaft direction of the rotating shaft with an interval between the adjacent core wires being in a range of 0.25 to 0.30 mm.

In this constitution, a plurality of the core wires are preferably arranged side by side in a shaft direction of the rotating shaft such that the interval between the adjacent core wires is in a range of 0.25 to 0.50 mm. Alternatively, a plurality of the core wires are more preferably arranged side by side in a shaft direction of the rotating shaft such that the interval between the adjacent core wires is in a range of 0.25 to 0.30 mm. In the case where the interval between the adjacent core wires is less than 0.25 mm, the number of the core wires to be embedded inside the vane member body is increased. As a result, rigidity of the vane member is increased and flexibility of the vane member is decreased. In the case where the interval between the adjacent core wires exceeds 0.50 mm (particularly, 0.30 mm), the number of the core wires to be embedded inside the vane member body is decreased. As a result, there is a possibility that the deformation force generated inside the core wires when bending cannot be sufficiently reduced. For this reason, in the case where the interval between the adjacent core wires is in a range of 0.25 to 0.50 mm (particularly, in a range of 0.25 to 0.30 mm), flexibility of the vane member can be appropriately maintained. In other words, the vane member for a paper sheet-conveyance impeller of this constitution can suppress plastic deformation and further enhance bending durability and restorability.

According to another standpoint, the vane member for a paper sheet-conveyance impeller of the present invention preferably has the following constitution.

The vane member is arranged so as to protrude from the outer peripheral surface of the cylindrical member along a radial direction orthogonal to the shaft direction of the rotating shaft of the cylindrical member, and the core wires are embedded along the radial direction of the rotating shaft of the cylindrical member.

The term "along a radial direction" used herein is not limited to being parallel to the radial direction. The term "along a radial direction" includes the case of curving in a radial direction and the case of inclining to a straight line showing the radial direction at a predetermined angle.

Advantageous Effect of the Invention

As described above, according to the present invention, the vane member for a paper sheet-conveyance impeller that suppresses plastic deformation and enhances bending durability and restorability can be provided.

BRIEF DESCRIPTION OF THE DRAWINGS

FIG. 1 is a view schematically illustrating a paper sheet-conveyance impeller, (a) is a perspective view and (b) is a top view.

FIG. 2 is a perspective view schematically illustrating a cylindrical member of a paper sheet-conveyance impeller.

FIG. 3 is a view schematically illustrating a vane member for a paper sheet-conveyance impeller, (a) is a cross-sectional view of a part of the vane member in a radial direction of a rotating shaft and (b) is X-X cross-sectional view of (a).

FIG. 4 is a schematic view schematically illustrating a test apparatus used in a bending durability test.

FIG. 5 is a schematic view schematically illustrating a restorability test.

FIG. 6 is a graph showing test results of a restorability test.

MODE FOR CARRYING OUT THE INVENTION

The embodiments of the present invention will be described by reference to the drawings.

The vane member for a paper sheet-conveyance impeller according to the present embodiment is used in a paper sheet-conveyance impeller. The paper sheet-conveyance impeller is used in a conveyance device which conveys paper sheets. The conveyance device is installed in automatic ticket gates, automatic register change machines, money changing machines, automatic ticket vending machines, and the like in order to convey or collect paper sheets such as paper moneys, magnetic cards and tickets.

(Constitution of Paper Sheet-Conveyance Impeller)

As illustrated in FIG. 1, a paper sheet-conveyance impeller 1 has a cylindrical member 10 and vane members 20.

In the present embodiment, the vane members 20 are arranged along a radial direction orthogonal to a shaft direction G of a rotating shaft 11 of the cylindrical member 10. The vane member 20 is arranged so as to protrude from an outer peripheral surface of the cylindrical member 10. In FIG. 1, the shaft direction G and a circumferential direction R of the rotating shaft 11 are indicated by arrows. In the present embodiment, four vane members 20 are arranged on the cylindrical member 10. The four vane members 20 are arranged at equal intervals in the circumferential direction R of the rotating shaft 11 of the cylindrical member 10. The number of the vane member 20 is not limited to 4. The number of the vane member 20 is 1 or more. The number of the vane member 20 is preferably 2 to 16. The vane members 20 may not be arranged at equal intervals in the circumferential direction R of the rotating shaft of the cylindrical member 10.

(Constitution of Cylindrical Member)

As illustrated in FIG. 2, the cylindrical member 10 is formed into a nearly cylindrical shape. The cylindrical member 10 is not limited to a nearly cylindrical shape. The cylindrical member 10 may be formed into a nearly polygonal shape. The cylindrical member 10 has the rotating shaft 11 (see (b) of FIG. 1), a base 12, a shaft hole 13 and notch portions 14.

The base 12 may be formed of a resin material. The base 12 is formed of, for example, an engineering plastic. The engineering plastic is a polyacetal, a polyamide, a polybutylene terephthalate, or the like. The base 12 has an upper surface 12a, a bottom surface 12b and an outer peripheral surface 12c. In the present embodiment, the shaft hole 13 is formed at a nearly center of the upper surface 12a and the bottom surface 12b (see (b) of FIG. 1). The rotating shaft 11 is inserted in the shaft hole 13. That is, the rotating shaft 11 is arranged such that its shaft direction is along a shaft direction of the cylindrical member 10. The base 12 is unrotatably supported on the rotating shaft 11. In other words, the base 12 is fixed to the rotating shaft 11. The cylindrical member 10 may not have the shaft hole 13. In other words, the rotating shaft 11 may be integrally formed with the base 12. Thus, the cylindrical member 10 is rotatably constituted. In other words, the cylindrical member 10 is constituted so as to rotate by rotating the rotating shaft 11.

The notch portion 14 is formed so as to open on the upper surface 12a. Furthermore, the notch portion 14 is formed so as to open on the outer peripheral surface 12c in the upper part of the outer peripheral surface 12c. The upper part of the outer peripheral surface 12c is a part of the outer peripheral surface 12c near the upper surface 12a than the bottom surface 12b. Furthermore, the notch portion 14 is formed so as to open to the shaft hole 13. The notch portion 14 may not be formed so as to open to the shaft hole 13. The notch portion 14 may be formed so as to open to any one of the upper surface 12a and the bottom surface 12b. The notch portion 14 may be formed so as to open to the upper surface 12a and the bottom surface 12b. The vane member 20 is inserted in the notch portion 14. In the present embodiment, the vane member 20 is inserted in the notch portion 14 from the opening on the upper surface 12a. The shape of the notch portion 14 is formed into a shape such that the vane member 20 is fittable thereto and does not detach in the radial direction of the rotating shaft 11. The notch portion 14 fixes the vane member 20 in the radial direction of the rotating shaft 11. On the other hand, the notch portion 14 allows the movement of the vane member 20 in the shaft direction G of the rotating shaft 11. In other words, the cylindrical member 10 is constituted such that the vane member 20 is detachable. Accordingly, in the case where maintenance of the vane member 20 is required due to the abrasion and the like, the vane member 20 can be easily detached and attached, thereby being replaced.

(Constitution of Vane Member)

As illustrated in FIG. 1 and FIG. 3, the vane member 20 has the vane member body 21 and core wires 25. In (a) of FIG. 1, the description of the core wires 25 are omitted. In (b) of FIG. 1, the description of a plurality of convex portions 24 on the vane member body 21 is omitted.

The vane member body 21 of the present embodiment has the base 22, a body part 23 and a plurality of the convex portions 24. In (b) of FIG. 3, boundary lines between the base 22, the body part 23 and a plurality of the convex portions 24 are shown by broken lines. For the vane member body 21, the base 22, the body part 23 and a plurality of the convex portions 24 may be integrally formed. The vane member body 21 is formed of a thermosetting polyurethane elastomer. The thermosetting polyurethane elastomer has excellent abrasion resistance and elasticity.

As illustrated in FIG. 1 and (a) of FIG. 3, the base 22 is formed on the end (see FIG. 1) at the rotating shaft 11 side of the body part 23. The base 22 is formed so as to bulge from the body part 23 such that the thickness in the circumferential direction R of the rotating shaft 11 increases. The base 22 and a part of the body part 23 are inserted in the notch portion 14 and fitted thereto. In the present embodiment, the base 22 is formed so as to be a nearly semicircular shape in the cross-section orthogonal to the shaft direction G of the rotating shaft 11. The shape of the base 22 may not be a nearly semicircular shape. The shape of the base 22 may be any shape such that the vane member 20 does not detach in a radial direction of the rotating shaft 11 from the notch portion 14 and is, for example, a concavo-convex shape.

The body part 23 is formed in a nearly rectangular solid shape. In the present embodiment, the body part 23 is formed so as to have a length La in a radial direction of the rotating shaft 11 being longer than a length Lc in the shaft direction G of the rotating shaft 11. The body part 23 is formed so as to have the length Lc in the shaft direction G of the rotating shaft 11 being longer than a length Lb along the circumferential direction R of the rotating shaft 11.

A plurality of the convex portions 24 are preferably formed on any one surface or on both surfaces of the surfaces of the body part 23 facing the circumferential direction R of the rotating shaft 11, although not essential. The surface of the body part 23 and/or the surfaces of a plurality of the convex portions 24 are faces to contact paper sheets. The number of the convex portions 24 is not limited to the number illustrated in FIG. 3. Since the convex portions 24 are formed on the surface of the body part 23, the body part 23 is easy to bend when contacting with paper sheets. Furthermore, frictional locking force between the body part 23 and paper sheets is improved, slip between the body art 23 and paper sheets is decreased, whereby satisfactory conveyance can be performed.

The thermosetting polyurethane elastomer forming the vane member body 21 can be obtained by thermally curing a prepolymer obtained from a polyol and a polyisocyanate, and a curing agent. Alternatively, the thermosetting polyurethane elastomer can be obtained by thermally curing a polyol, a polyisocyanate and a curing agent. The thermosetting polyurethane elastomer is preferably compounded so as to have an NCO index value (isocyanate group/active hydrogen group) that is a molar equivalent ratio being in a range of 0.8 to 1.0. The isocyanate group is an isocyanate group of the prepolymer or polyisocyanate. The active hydrogen group is an active hydrogen group of the polyol and curing agent, an active hydrogen group of the polyol, or an active hydrogen group of the curing agent.

The polyol is not limited to a polyol having two or more hydroxyl groups in the molecule. As the polyol, for example, polyether polyols, polyester polyols, polylactone-based polyester polyols, polycarbonate polyols, polyolefin polyols, and the like can be used in one kind alone or as a combination of two or more kinds thereof.

The polyether polyols include polyethylene glycol, polypropylene glycol, polytetramethylene ether glycol, and the like.

The polyester polyols can be obtained by reacting a dicarboxylic acid compound with a polyol compound. The dicarboxylic acid compound includes adipic acid, sebacic acid, itaconic acid, maleic anhydride, terephthalic acid, isophthalic acid, fumaric acid, succinic acid, oxalic acid, malonic acid, glutaric acid, pimelic acid, suberic acid, azelaic acid, and the like. The polyol compound includes ethylene glycol, diethylene glycol, 1,4-butanediol, 1,6-hexanediol, neopentyl glycol, 1,2-propanediol, 1,3-propanediol, 1,9-nonanediol, 3-methyl-1,5-pentanediol, tripropylene glycol, trimethylolpropane, glycerin, and the like.

The polylactone-based polyester polyols include polycaprolactone polyol, poly-β-methyl-δ-valerolactone, and the like.

The polycarbonate polyols can be obtained by reacting a diol compound with a carbonate compound. The diol compound includes 1,3-propanediol, 1,4-butanediol, 1,6-hexanediol, diethylene glycol, polyethylene glycol, polypropylene glycol, polytetramethylene glycol, and the like. The carbonate compound includes phosgene, dialkyl carbonate, diphenyl carbonate, and the like.

The polyolefin polyols include polybutadiene polyol, polyisoprene polyol, and the like.

The polyol is particularly preferably polyether polyols. Polyether-based thermosetting urethanes formed from the polyether polyols have excellent hydrolysis resistance as compared with polyester-based polyurethanes formed from polyester polyols, and therefore show small aged deterioration even after long-term use, and have excellent bending durability.

The polyol may be used together with a low molecular weight polyol. The low molecular weight polyol includes, for example, aliphatic diols such as ethylene glycol, 1,2-propanediol, 1,3-propanediol, 2-methyl-1,3-propanediol, 2-butyl-2-ethyl-1,3-propanediol, 1,3-butanediol, 1,4-butanediol, neopentyl glycol (2,2-dimethyl-1,3-propanediol), 2-isopropyl-1,4-butanediol, 3-methyl-2,4-pentanediol, 2,4-pentanediol, 1,5-pentanediol, 3-methyl-1,5-pentanediol, 2-methyl-2,4-pentanediol, 2,4-dimethyl-1,5-pentanediol, 2,4-diethyl-1,5-pentanediol, 1,5-hexanediol, 1,6-hexanediol, 2-ethyl-1,3-hexanediol, 2-ethyl-1,6-hexanediol, 1,7-heptanediol, 3,5-heptanediol, 1,8-octanediol, 2-methtyl-1,8-octanediol, 1,9-nonanediol, and 1,10-decanediol; alicyclic diols such as cyclohexanedimethanol (for example, 1,4-cyclohexanedimethanol), cyclohexanediol (for example, 1,3-cyclohexanediol or 1,4-cyclohexanediol), and 2-bis(4-hydroxycyclohexyl)-propane; and trivalent or more polyols such as trimethylolethane, trimethylolpropane, hexytols, pentytols, glycerin, polyglycerin, pentaerythritol, dipentaerythritol, and tetramethylolpropane.

As the polyisocyanate, for example, aromatic isocyanates, aliphatic polyisocyanates, alicyclic polyisocyanates, carbodiimide-modified polyisocyanates of each of the above polyisocyanates, isocyanurate-modified polyisocyanates of each of the above polyisocyanates, and the like can be used in one kind alone or as a combination of two or more kinds thereof.

The aromatic isocyanates include 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylene diisocyanate (XDI), tetramethylxylene diisocyanate (TMXDI), polymethylene polyphenylene polyisocyanate, tolidine diisocyanate (TODI), 1,5-naphthalene diisocyanate (NDI), and the like.

The aliphatic polyisocyanates include hexamethylene diisocyanate (HDI), trimethylhexamethylene diisocyanate (TMHDI), lysine diisocyanate, norbornene diisocyanate methyl (NBDI), and the like.

The alicyclic polyisocyanates include transcyclohexane-1-4-diisocyanate, isophorone diisocyanate (IPDI), hydrogenated xylylene diisocyanate (H6XDI, hydrogenated XDI), dicyclohexylmethane diisocyanate (H12MDI, hydrogenated MDI), and the like.

As the curing agent, curing agents generally used when forming a thermosetting polyurethane elastomer can be used. Kinds of an active hydrogen group of the curing agent include, for example, a hydroxyl group, an amino group, an imino group, a carboxyl group, a urethane group, a thiol group, an epoxy group, and the like. As the curing agent, specifically, 4,4'-methylenebis(o-chloroaniline) (MOCA), 4,4'-methylenedianiline (MDA), and the like can be used.

The thermosetting polyurethane elastomer may contain additives such as a plasticizer, a coloring agent, an antioxidant, a filler, a hydrolysis inhibitor, a reaction accelerator, a releasing agent, and a flame retardant as necessary. However, it is preferred that a plasticizer is not added to the thermosetting polyurethane elastomer used in the vane member body 21 of the present embodiment.

In the present embodiment, a part of the core wire 25 is embedded inside the body part 23 of the vane member body 21 as illustrated in (b) of FIG. 1 and (a) of FIG. 3. The remaining part of the core wire 25 may be exposed to the outside. The whole of the core wire 25 may be embedded inside the vane member body 21. In the present embodiment, a plurality of the core wires 25 are embedded side by side along the shaft direction G of the rotating shaft 11. A plurality of the core wires 25 are preferably arranged side by side in the shaft direction G of the rotating shaft 11 such with an interval Ld between the adjacent core wires 25 being in a range of 0.25 to 0.50 mm as illustrated in (b) of FIG. 3. The interval Ld between the adjacent core wires 25 is more preferably in a range of 0.25 to 0.30 mm.

The core wire 25 includes a polyester fiber. The core wire 25 may be a twisted yarn of polyester fibers and may be an untwisted yarn including a single filament. The polyester fiber has excellent heat resistance and strength. In other words, in the case where the core wire 25 including a polyester fiber is embedded in the vane member 20, bending durability of the vane member 20 to breakage is improved. The fineness of the core wire 25 is preferably in a range of 100 to 300 deniers. The core wire diameter is preferably in a range of 0.10 to 0.19 mm. The core wire 25 is preferably a twisted yarn having a fineness of 120 to 180 deniers. The core wire can contain fibers other than the polyester fiber.

The vane member 20 is preferably formed so as to have a length in a radial direction of the rotating shaft 11 being 15 to 50 mm, a length (width) in the shaft direction G of the rotating shaft 11 being 2 to 10 mm, and a length (thickness) in a circumferential direction of the rotating shaft being about 1 to 4 mm (Production Method of Vane Member)

The production method of the vane member 20 will be described below. The vane member 20 may be produced by casting using a cylindrical mold including a double cylindrical mold or a flat mold as a split mold.

First, the production method of the vane member 20 using a cylindrical mold is described.

The cylindrical mold is a double cylindrical mold including an inner cylindrical mold and an outer cylindrical mold. The inner cylindrical mold is constituted so as to be capable of being arranged inside the outer cylindrical mold. Depressions to form the base 22 and a plurality of convex portions 24 are formed on the outer peripheral surface of the inner cylindrical mold.

(1) The core wire 25 is wound on the outer peripheral surface of the inner cylindrical mold. In this case, the core wire 25 is wound such that the interval between the adjacent core wires 25 has a predetermined distance.

(2) The inner cylindrical mold is inserted in the outer cylindrical mold so as to be arranged nearly concentrically.

(3) A liquid material to form the vane member body 21 is cast into a space formed between the inner cylindrical mold and the outer cylindrical mold. The liquid material is heated to thermally cure, thereby forming the base 22, the body part 23 and a plurality of convex portions 24, each including a polyurethane elastomer.

(4) The cylindrical vane member precursor obtained by demolding from the cylindrical mold is cut to obtain the vane member 20.

Next, the production method of the vane member 20 using the flat mold is described.

The flat mold is a split mold of a first flat mold and a second flat mold.

(1) A plurality of the core wires 25 are fixed and arranged to the first flat mold in side-by-side state. In this case, the core wires 25 are arranged such that the interval between the adjacent core wires 25 has a predetermined distance.

(2) The second flat mold is adjusted and arranged to the first flat mold having the core wires 25 fixed thereto.

(3) A liquid material to form the vane member body 21 is cast inside the flat mold. The liquid material is heated to thermally cure, thereby forming the base 22, the body part 23 and a plurality of convex portions 24, each including a polyurethane elastomer.

(4) The vane member 20 is obtained by demolding from the flat mold.

In the production method using the flat mold, the vane member 20 may be formed one by one, and a set of a plurality of the vane members 20 may be formed. In this case, the flat mold having a size that can form a set of a plurality of the vane members 20 is used. The set formed is cut into a predetermined size, to thereby obtain a plurality of vane members 20.

The vane member 20 for the paper sheet-conveyance impeller 1 of the present embodiment has the following characteristics.

At least one vane member 20 for the paper sheet-conveyance impeller 1 is arranged so as to protrude from the outer peripheral surface of the cylindrical member 10 along a radial direction orthogonal to the shaft direction G of the rotating shaft 11 of the rotatable cylindrical member 10. The vane member 20 for the paper sheet-conveyance impeller 1 is brought into contact with paper sheets to convey those.

The vane member 20 for the paper sheet-conveyance impeller 1 includes the vane member body 21 and the core wires 25. The vane member body 21 includes a thermosetting polyurethane elastomer. The core wire 25 includes a polyester fiber. At least a part of the core wire 25 is embedded inside the vane member body 21 along a radial direction of the rotating shaft 11. A plurality of the core wires 25 are arranged side by side in the shaft direction G of the rotating shaft 11 of the cylindrical member 10.

For the vane member body 21, elastomer materials having excellent elasticity are preferable from the standpoint of restorability, and of the elastomer materials, a thermosetting polyurethane elastomer has particularly excellent abrasion resistance and elasticity. The polyester fiber forming the core wire 25 has excellent heat resistance and strength. For the core wire 25, a polyester fiber, an aramid fiber and a nylon fiber are preferable from the standpoint of bending durability, and a polyester fiber that is difficult to buckle against plastic deformation is particularly suitable.

In the case where the vane member body 21 includes a thermosetting polyurethane elastomer and the core wire 25 includes a polyester, deformation force (compressive force) generated inside the core wire 25 when bending can be reduced and bending durability and restorability of the vane member 20 are enhanced. In other words, the vane member 20 for the paper sheet-conveyance impeller 1 can suppress plastic deformation and enhance bending durability and restorability.

In the vane member 20 for the paper sheet-conveyance impeller 1 of the present embodiment, the fineness of the core wire 25 is preferably in a range of 100 to 300 deniers. In this case, the diameter of the core wire 25 is preferably in a range of 0.10 to 0.19 mm. Furthermore, the fineness of the core wire 25 is more preferably in a range of 120 to 180 deniers. In other words, the diameter of the core wire 25 is relatively small. In the case where the diameter of the core wire 25 is large, the deformation force (compressive force) inside the core wire 25 (particularly, a vicinity of the outer peripheral part) is increased when bending as compared with the case where the diameter of the core wire 25 is small, and buckling and breakage are easy to occur. Therefore, by making the diameter of the core wire 25 relatively small, the deformation force (compressive force) generated inside the core wire 25 when bending can be reduced and bending durability and restorability are improved. In other words, the vane member 20 for the paper sheet-conveyance impeller 1 of this constitution can suppress plastic deformation and further enhance bending durability and restorability.

In the vane member 20 for the paper sheet-conveyance impeller 1 of the present embodiment, it is preferred that the vane member body 21 includes a thermosetting polyurethane elastomer containing a plasticizer and the amount of the plasticizer is 20 parts by mass or less per 100 parts by weight of the thermosetting polyurethane elastomer. It is more preferred that the vane member body 21 includes a thermosetting polyurethane elastomer containing a plasticizer and the amount of the plasticizer is 5 parts by mass or less per 100 parts by weight of the thermosetting polyurethane elastomer. The vane member body 21 preferably includes a thermosetting polyurethane elastomer containing no plasticizer. In the case where a large amount of a plasticizer is contained in the vane member body 21, the plasticizer bleeds out in the course of repeated contact of the vane member body 21 with paper sheets in long-term use, and transfers on the surfaces of paper sheets. As a result, the vane member body 21 contacting paper sheets plastically deforms and warpage of the vane member 20 occurs. Therefore, in the case where the amount of the plasticizer contained in the vane member body 21 is decreased or the vane member body 21 does not contain the plasticizer, warpage of the vane member 20 is relatively reduced and restoring force is improved. In other words, the vane member 20 for the paper sheet-conveyance impeller 1 of this constitution can suppress plastic deformation and further enhance bending durability and restorability.

The expression "the thermosetting polyurethane elastomer contains no plasticizer" means that a plasticizer is not substantially contained in the thermosetting polyurethane elastomer. The expression "is not substantially contained" used herein means that the plasticizer is allowed to be contained as impurities but is not intentionally added.

In the vane member 20 for the paper sheet-conveyance impeller 1 of the present embodiment, a plurality of the core wires 25 are preferably arranged side by side in the shaft direction of the rotating shaft 11 such that the interval between the adjacent core wires 25 is in a range of 0.25 to 0.50 mm A plurality of core wires 25 are more preferably arranged side by side in the shaft direction of the rotating shaft 11 such that the interval between the adjacent core wires 25 is in a range of 0.25 to 0.30 mm. In the case where the interval between the adjacent core wires 25 is less than 0.25 mm, the number of core wires 25 to be embedded inside the vane member body 21 is increased. As a result, rigidity of the vane member 20 is increased and flexibility of the vane member 20 is decreased. In the case where the interval between the adjacent core wires 25 exceeds 0.50 mm (particularly, 0.30 mm), the number of the core wires 25 to be embedded inside the vane member body 21 is decreased. As a result, there is a possibility that deformation force generated inside the core wires 25 when bending cannot be sufficiently reduced. For this reason, in the case where the interval between the adjacent core wires 25 is in a range of 0.25 to 0.50 mm (particularly, in a range of 0.25 to 0.30 mm), the flexibility of the vane member 20 can be appropriately maintained. In other words, the vane member 20 for the paper sheet-conveyance impeller 1 of this constitution can suppress plastic deformation and further enhance bending durability and restorability.

The embodiment of the present invention is described above based on the drawings, but it should be understood that the specific constitution is not limited to those embodiments and examples. The scope of the present invention is shown by not only the above-described description of embodiments and examples but also the claims, and meanings equivalent to the claims and all of the changes within the scope are included.

In the above embodiment, the vane member 20 is arranged so as to linearly protrude from the outer peripheral surface of the cylindrical member 10 along a radial direction orthogonal to the shaft direction G of the rotating shaft 11 of the cylindrical member 10. However, the structure of the vane member 20 is not limited to this. For example, the vane member may have a shape curved along the radial direction. Alternatively, the vane member 20 may be arranged inclining at a predetermined angle in the radial direction. The predetermined angle is optionally set to a range of, for example, 0 to 90°. In the case of the vane member arranged inclining at a predetermined angle in the radial direction like above, an angle may be provided on the notch portion of the cylindrical member and the body part of the vane member body may have a bending point. In the case where the body part of the vane member body has a bending point, the position of the bending point may be, for example, a vicinity of a connecting part to the base.

In the present invention, the number of the vane member 20 is not limited to 4. The number of the vane member 20 is 1 or more. The vane member 20 may not be arranged at equal intervals in the circumferential direction R of the rotating shaft of the cylindrical member 10.

In the present invention, the cylindrical member 10 is not limited to a nearly cylindrical shape. The cylindrical member 10 may be formed into a nearly polygonal shape. The cylindrical member 10 may not have a shaft hole 13 in which the rotating shaft 11 is inserted. In other words, for the cylindrical member 10, the rotating shaft 11 and the base 12 may be formed integrally.

In the present invention, the notch portion 14 may not be formed so as to open to the shaft hole 13. The notch portion 14 may be formed so as to open to any one of an upper surface 12a and a bottom surface 12b. The notch portion 14 may be formed so as to open to the upper surface 12a and the bottom surface 12b.

In the present invention, the shape of the base 22 may not be a nearly semicircular shape. The shape of the base 22 may be any shape such that the vane member 20 does not detach in a radial direction of the rotating shaft 11 from the notch portion 14. The shape of the base 22 may be, for example, a shape such as concavo-convex shape.

In the present invention, a part of the core wire 25 is embedded inside the vane member body 21, and the remaining part may be exposed to the outside. The whole of the core wire 25 may be embedded inside the vane member body 21.

EXAMPLES

Examples of the present invention are described below.

In the examples, 15 vane members 20 for a paper sheet-conveyance impeller of Examples 1 to 15 and 9 vane members 120 for a paper sheet-conveyance impeller of Comparative Examples 1 to 9 were prepared. In the vane members 20 for a paper sheet-conveyance impeller of Examples 1 to 9 and the vane members 120 for a paper sheet-conveyance impeller of Comparative Examples 1 to 8, a polyurethane raw material composition obtained by mixing under stirring: a liquid raw material obtained by adding parts by mass of dioctyl phthalate (DOP) as a plasticizer to 100 parts by mass of a polyether-based urethane prepolymer, followed by mixing under stirring the resulting mixture at 60° C.; and a liquid raw material obtained by dissolving 10 parts by mass of 3,3'-dichloro-4,4'-diaminodiphenylmethane (MOCA) as a curing agent at 120° C., was used as a liquid polyurethane raw material composition to form the vane member body 21 of the vane member 20. In the vane members 20 for a paper sheet-conveyance impeller of Examples 10, 11 and 12, polyurethane raw material compositions in which the amount of the plasticizer added was 10, 5 and 0 parts by mass were used respectively in place of the polyurethane raw material composition in which the amount of the plasticizer added was parts by mass, used in the vane member 20 for a paper sheet-conveyance impeller of Example 1. In the vane members 20 for a paper sheet-conveyance impeller of Examples 13, 14 and 15, polyurethane raw material compositions containing no amount of the plasticizer (0 part by mass) were used in place of the polyurethane raw material compositions in which the amount of the plasticizer added was 20 parts by mass, used in the vane members 20 for a paper sheet-conveyance impeller of Examples 2, 3 and 5, respectively. In the vane member 120 for a paper sheet-conveyance impeller of Comparative Example 9, an unvulcanized rubber sheet obtained by adding 0.5 parts by weight of sulfur, 20 parts by mass of dioctyl phthalate (DOP) as a plasticizer and a vulcanization accelerator to 100 parts by weight of hydrogenated nitrile rubber (N-NBR), followed by conducting rubber kneading thereto was used. The vane members 20 for a paper sheet-conveyance impeller of the Examples and the vane members 120 for a paper sheet-conveyance impeller of the Comparative Examples have the same constitution as in the vane members 20 for a paper sheet-conveyance impeller of the above-described embodiments except that the material and fineness of the core wire 25 and the interval between the adjacent core wires were changed.

The vane members 20 for a paper sheet-conveyance impeller of the Examples and the vane members 120 for a paper sheet-conveyance impeller of the Comparative Examples were produced using a cylindrical mold having a double cylindrical mold. The production process of the vane members 20 for a paper sheet-conveyance impeller of the Examples and the vane members 120 for a paper sheet-conveyance impeller of the Comparative Examples 1 to 8 is as follows.

(1) The core wire 25 was spirally wound on the outer peripheral surface of the inner cylindrical mold such that the interval between the adjacent core wires 25 had a predetermined distance. The interval between the adjacent core wires 25 was defined as a cycle of the core wire.
(2) The inner cylindrical mold was inserted and arranged in the outer cylindrical mold.
(3) The polyurethane raw material composition was cast in a cavity of the mold and thermally cured at 115° C. for 25 minutes.
(4) After demolding from the mold, the resulting cured product was subjected to an aging treatment at 70° C. for 12 hours to thereby obtain a cylindrical vane member precursor.
(5) The cylindrical vane member precursor was cut in 3 mm width in a direction along the core wire 25. The cut product was further cut in 20 mm length in a direction orthogonal to the core wire 25, to thereby obtain a vane member for a paper sheet-conveyance impeller.
(6) The vane members 20 and 120 obtained were attached to a polyacetal-made cylindrical member 10 to obtain a paper sheet-conveyance impeller 1.

The production process of the vane member 120 for a paper sheet-conveyance impeller of Comparative Example 9 is that the steps (2) to (4) in the above steps (1) to (6) are replaced with the following steps.
(2a) The unvulcanized rubber sheet was wound on the core wire, and the whole was then arranged inside a cylindrical jacket of a vulcanizing apparatus having the outer cylindrical mold provided therein.
(3a) The whole was placed in a vulcanizer and vulcanized under pressuring and heating by the vulcanizing apparatus, to thereby form a cylindrical vane member precursor.
(4a) After demolding from the mold, the cylindrical vane member precursor was obtained.

Material and fineness of the core wires 25 of the vane members 20 for a paper sheet-conveyance impeller of the Examples and the vane members 120 for a paper sheet-conveyance impeller of the Comparative Examples were changed as follows. The material and fineness of the vane members 20 for a paper sheet-conveyance impeller of the Examples are shown in Table 1. The material and fineness of the core wires 25 of the vane members 120 for a paper sheet-conveyance impeller of the Comparative Examples are shown in Table 2.

Examples 1, 4, 5, 8 to 12 and 15 and Comparative Example 9: Polyester fiber (PET, No. 60 count, 150 deniers)
Examples 2 and 13: Polyester fiber (PET, No. 90 count, 100 deniers)
Examples 3 and 14: Polyester fiber (PET, No. 40 count, 300 deniers)
Example 6: Polyester fiber (PET, No. 100 count, 90 deniers)
Example 7: Polyester fiber (PET, No. 30 count, 450 deniers)
Comparative Example 1: Nylon fiber (66 Nylon, No. 60 count, 150 deniers)
Comparative Example 2: Nylon fiber (66 Nylon, No. 50 count, 210 deniers)
Comparative Example 3: Nylon fiber (66 Nylon, No. 40 count, 300 deniers)
Comparative Example 4: Aramid fiber (66 Nylon, No. 30 count, 450 deniers)
Comparative Example 5: Aramid fiber (para-aramid, No. 60 count, 150 deniers)
Comparative Examples 6 and 8: Aramid fiber (para-aramid, No. 45 count, 200 deniers)
Comparative Example 7: Aramid fiber (para-aramid, No. 30 count, 450 deniers)

The cycles of the core wires 25 in the vane members 20 for a paper sheet-conveyance impeller of the Examples and the vane members 120 for a paper sheet-conveyance impeller of the Comparative Examples were changed as follows. The cycles of the core wires 25 in the vane members 20 for a paper sheet-conveyance impeller of Examples are shown in Table 1. The cycles of the core wires 25 in the vane members 120 for a paper sheet-conveyance impeller of Comparative Examples are shown in Table 2. The cycle of the core wires 25 means an interval between the adjacent core wires 25 as described above.

Examples 1 to 3 and 6 and Comparative Examples 1 to 3, 5, 6 and 9: 0.3 mm
Example 4: 0.25 mm
Examples 5 and 7 and Comparative Examples 4 and 7: 0.5 mm
Example 8 and Comparative Example 8: 0.2 mm
Example 9: 0.7 mm

TABLE 1

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Material of body | Poly-urethane | Poly-urethane | Poly-urethane | Poly-urethane | Poly-urethane | Poly-urethane | Poly-urethane | Poly-urethane | Poly-urethane |
| Material of core wire | Polyester | Polyester | Polyester | Polyester | Polyester | Polyester | Polyester | Polyester | Polyester |
| Fineness of core wire (deniers) | 150 | 100 | 300 | 150 | 150 | 90 | 450 | 150 | 150 |
| Cycle of core wire (mm) | 0.3 | 0.3 | 0.3 | 0.25 | 0.5 | 0.3 | 0.5 | 0.2 | 0.7 |
| Amount of plasticizer added (part by mass) | 20 | 20 | 20 | 20 | 20 | 20 | 20 | 20 | 20 |

TABLE 1-continued

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| At bending of about 70,000 times | Presence of breakage | No | No | No | No | No | No | No | No | No |
|  | Presence of deformation | No | No | No | No | No | No | No | No | No |
| At bending of about 1,700,000 times | Presence of breakage | No | No | No | No | No | Yes (tip cracking) | Yes (core wire buckling) | Yes (core wire buckling) | Yes (tip cracking) |
|  | Presence of deformation | No | A | B | No | A | Yes | No | No | No |
| Judgement |  | ⊙ | ○ | ○ | ⊙ | ○ | Δ | Δ | Δ | Δ |

TABLE 2

|  |  | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|---|
| Material of body |  | Polyurethane | Polyurethane | Polyurethane | Polyurethane | Polyurethane | Polyurethane | Polyurethane | Polyurethane | H-NBR |
| Material of core wire |  | Nylon | Nylon | Nylon | Nylon | Aramid | Aramid | Aramid | Aramid | Polyester |
| Fineness of core wire (deniers) |  | 150 | 210 | 300 | 450 | 150 | 200 | 450 | 200 | 150 |
| Cycle of core wire (mm) |  | 0.3 | 0.3 | 0.3 | 0.5 | 0.3 | 0.3 | 0.5 | 0.2 | 0.3 |
| Amount of plasticizer added (part by mass) |  | 20 | 20 | 20 | 20 | 20 | 20 | 20 | 20 | 20 |
| At bending of about 70,000 times | Presence of breakage | No | No | No | Yes (core wire buckling) | Yes (core wire buckling) | Yes (core wire buckling) | Yes (core wire buckling) | Yes (core wire buckling) | Yes (core wire buckling) |
|  | Presence of deformation | No | No | No | — | — | — | — | — | — |
| At bending of about 1,700,000 times | Presence of breakage | Yes (core wire buckling) | Yes (core wire buckling) | Yes (core wire buckling) | — | — | — | — | — | — |
|  | Presence of deformation | — | — | — | — | — | — | — | — | — |
| Judgement |  | X | X | X | X | X | X | X | X | X |

As shown in Tables 1 and 2, Examples 1 to 9 are that the combination of the material of the body and the material of the core wire is the combination of "polyurethane+polyester". Comparative Examples 1 to 4 are that the combination of the material of the body and the material of the core wire is the combination of "polyurethane+nylon". Comparative Examples 5 to 8 are that the combination of the material of the body and the material of the core wire is the combination of "polyurethane+aramid". Comparative Example 9 is that the combination of the material of the body and the material of the core wire is "hydrogenated nitrile rubber+polyester".

The bending durability test and restorability test were conducted for the vane members 20 for a paper sheet-conveyance impeller of the Examples and the vane members 120 for a paper sheet-conveyance impeller of the Comparative Examples.

The bending durability test was conducted for the vane members 20 for a paper sheet-conveyance impeller of Examples 1 to 9 and the vane members 120 for a paper sheet-conveyance impeller of Comparative Examples 1 to 9. A test apparatus 30 illustrated in FIG. 4 was used in the bending durability test. The test apparatus 30 of the bending durability test is that a motor 31 is connected to a slide base 32 of a stainless steel sheet through a bar 33. The test apparatus 30 of the bending durability test is constituted such that the slide base 32 attached to the bar 33 reciprocates in the order of arrow directions of (a) of FIG. 4 and (b) of FIG. 4 by the rotation of the motor 31. The vane member 20 for a paper sheet-conveyance impeller of each of the Examples and the vane member 120 for a paper sheet-conveyance impeller of each of the Comparative Examples are attached to a fixing member 35. The vane member 20 for a paper sheet-conveyance impeller of each of the Examples and the vane member 120 for a paper sheet-conveyance impeller of each of the Comparative Examples are attached so as to be brought into contact with the slide base 32 and bend in the order of the arrow directions of (a) of FIG. 4 and (b) of FIG. 4 by a reciprocating motion of the slide base 32. The vane members 20 for a paper sheet-conveyance impeller of Examples 1 to 9 and the vane members 120 for a paper sheet-conveyance impeller of Comparative Examples 1 to 9 were subjected to a reciprocating motion at a speed of 300 bending/min as one round trip being one bending using the test apparatus 30. The presence of breakage and plastic deformation of the vane member 20 for a paper sheet-conveyance impeller of each of the Examples and the vane member 120 for a paper sheet-conveyance impeller of each of the Comparative Examples at the bending of about 70,000 times and after the bending of about 1,700,000 times were judged.

The test results of the bending durability test of the vane members 20 for a paper sheet-conveyance impeller of Examples 1 to 9 are shown in Table 1. The test results of the bending durability test of the vane members 120 for a paper sheet-conveyance impeller of Comparative Examples 1 to 9 are shown in Table 2. In the bending durability test, presence of plastic deformation of the vane member for a paper sheet-conveyance impeller was judged based on the ratio of decrease of a length of the vane member for a paper sheet-conveyance impeller, and on whether the state of plastic deformation of the vane member for a paper sheet-conveyance impeller is bending or buckling. In the bending durability test, a length L11 before the bending durability test of from the center of the cylindrical member 10 in a radial direction orthogonal to the shaft direction G of the rotating shaft 11 of the cylindrical member 10 to the tip of the vane member 20, and an apparent length L12 after the bending durability test of from the center of the cylindrical member 10 in the radial direction orthogonal to the shaft direction of the rotating shaft 11 of the cylindrical member 10 to the tip of the vane member 20 were measured. The ratio of difference in the lengths of L11 and L12 was measured as the ratio of decrease of a length of the vane member. In the case where the decrease of a length of the vane member for a paper sheet-conveyance impeller is not observed, the plastic deformation was judged as "No". In the case where the decrease of a length of the vane member for a paper sheet-conveyance impeller was less than 2% and the state of plastic deformation was bending, the degree of plastic deformation of the vane member for a paper sheet-conveyance impeller was judged as A. In the case where the decrease of a length of the vane member for a paper sheet-conveyance impeller was less than 2% and the state of plastic deformation was a buckling, the degree of plastic deformation of the vane member for a paper sheet-conveyance impeller was judged as B. In the case where the decrease of a length of the vane member for a paper sheet-conveyance impeller was 2% or more and the state of plastic deformation was a bending or buckling, the degree of plastic deformation of the vane member for a paper sheet-conveyance impeller was judged as C. The comprehensive evaluation to bending durability of the vane member for a paper sheet impeller was judged as follows. In the case where the vane member for a paper sheet-conveyance impeller was not broken or was not plastically deformed, it was judged as ⊚. In the case where the vane member for a paper sheet-conveyance impeller was not broken but was slightly plastically deformed, it was judged as ○. In the case where the vane member for a paper sheet-conveyance impeller was broken but the degree of breakage was not problem on practical use, it was judged as Δ. In the case where the vane member for a paper sheet-conveyance impeller was broken and could not be practically used due to the damage, it was judged as x.

As shown in Tables 1 and 2, the vane members 20 for a paper sheet-conveyance impeller of Examples 1 to 9 in which the combination of the material of the body and the material of the core wire was the combination of "polyurethane+polyester" were that the comprehensive evaluation was ⊚, ○ or Δ. On the other hand, the vane members 120 for a paper sheet-conveyance impeller of Comparative Examples 1 to 9 in which the combination of the material of the body and the material of the core wire was the combination other than the combination of "polyurethane+polyester" were that the comprehensive evaluation was x. In other words, it could be confirmed that the vane members 20 for a paper sheet-conveyance impeller of Examples 1 to 9 in which the combination of the material of the body and the material of the core wire was the combination of "polyurethane+polyester" were excellent in bending durability as compared with the vane members 120 for a paper sheet-conveyance impeller of Comparative Examples 1 to 9 with the other combination.

Among the vane members 20 for a paper sheet-conveyance impeller of Examples 1 to 9, superiority or inferiority was compared by changing the fineness of the core wire. In comparison between the vane members 20 for a paper sheet-conveyance impeller of Examples 1, 2, 3, 6 and 7 in which the fineness of the core wire was changed, the comprehensive evaluation of the vane members 20 for a paper sheet-conveyance impeller of Examples 1, 2 and 3 in which the fineness was in a range of 100 to 300 deniers was ⊚ or ○, and it could be confirmed that those vane members were excellent in bending durability than the vane members 20 for a paper sheet-conveyance impeller of Examples 6 and 7. It is considered that the vane member 20 for a paper sheet-conveyance impeller of Example 6 is that since the fineness of the core wire was fine as 90 deniers, the vane member 20 could not maintain its rigidity and was easy to break, leading to a slight tip cracking. It is considered that the vane member 20 for a paper sheet-conveyance impeller of Example 7 is that since the fineness of the core wire was thick as 450 deniers, deformation force inside the core wire when bending was large and buckling of the core wire was generated. Since the vane member 20 for a paper sheet-conveyance impeller of Example 7 used a thick core wire, the core wire could not be arranged in a cycle of 0.3 mm and the cycle of the core wire was set 0.5 mm. In other word, it could be confirmed that in the case where the fineness of the core wire of the vane member is small, breakage and plastic deformation are further suppressed.

Among the vane members 20 for a paper sheet-conveyance impeller of Examples 1 to 9, superiority or inferiority was compared by changing the cycle of the core wire. In comparison between the vane members 20 for a paper sheet-conveyance impeller of Examples 1, 4, 5, 8 and 9 in which the cycle of the core wire was changed, the comprehensive evaluation of the vane members 20 for a paper sheet-conveyance impeller of Examples 1, 4 and 5 in which the cycle was in a range of 0.25 to 0.50 mm was 0 or 0, and it could be confirmed that those vane members were excellent in bending durability than the vane members 20 for a paper sheet-conveyance impeller of Examples 8 and 9. It is considered that the vane member 20 for a paper sheet-conveyance impeller of Example 8 is that since the cycle of the core wire was dense as 0.2 mm, flexibility of the vane member was reduced and buckling of core wire was generated. It is considered that the vane member 20 for a paper sheet-conveyance impeller of Example 9 is that since the cycle of the core wire was wide as 0.7 mm, the vane member 20 could not maintain its rigidity and was easy to break, leading to a slight tip cracking. In other words, it could be confirmed that in the case where the cycle of the core wire of the vane member is decreased, breakage and plastic deformation are further suppressed.

In the restorability test, the difference in restorability was confirmed by changing the amount of a plasticizer added. The restorability test was conducted for the respective vane members 20 for a paper sheet-conveyance impeller of Examples 1, 2, 3, 5 and 10 to 15. A test apparatus 40 illustrated in (a) of FIG. 5 was used in the restorability test. The test apparatus 40 of the restorability test is constituted so as to have a motor (not illustrated). The test apparatus 40 of the restorability test is that four vane members 20 for a paper sheet-conveyance impeller of Example 1 and Example 3 are mounted on the cylindrical member 10 rotatably attached to the motor. In the restorability test, the respective paper sheet-conveyance impellers 1 of Examples 1, 2, 3, 5 and 10 to 15 were rotated at 1000 rpm and the vane members 20 of the respective paper sheet-conveyance impellers of Examples 1, 2, 3, 5 and 10 to 15 were continuously brought into contact with a plain paper 41. (b) of FIG. 5 is a schematic view illustrating the shape of the vane member 20 before the restorability test, and (c) of FIG. 5 is a schematic view illustrating the shape of the vane member 20 after the restorability test. In the restorability test, a length L1 before the restorability test of from the center of the cylindrical member 10 in a radial direction orthogonal to the shaft direction G of the rotating shaft 11 of the cylindrical member 10 to the tip of the vane member 20, and an apparent length L2 after the restorability test of from the center of the cylindrical member 10 in the radial direction orthogonal to the shaft direction of the rotating shaft 11 of the cylindrical member 10 to the tip of the vane member 20 were measured. The ratio of difference in the lengths of L1 and L2 was measured as a decreasing rate of the tip of the vane member (hereinafter referred to as "vane member tip decreasing rate"). The vane member tip decreasing rates in the respective restorability tests conducted for Examples 1, 2, 3, 5 and 10 to 15 are shown in Table 3. Table 3 also shows the test results of the bending durability test and the restorability test.

As shown in Table 3, the vane member tip decreasing rate of each example measured at the pass of 50,000,000 times is that the vane member 20 for a paper sheet-conveyance impeller of Example 1 was 2.3%, whereas the vane member 20 for a paper sheet-conveyance impeller of Example 10 was 1.9%, the vane member 20 for a paper sheet-conveyance impeller of Example 11 was 1.7%, and the vane member 20 for a paper sheet-conveyance impeller of Example 12 was 1.4%. It is understood from those that the tip deceasing rate decreases and the restorability is improved while maintaining bending durability, with decreasing the amount of the plasticizer. Similarly, in the comparison of the respective vane members 20 for a paper sheet-conveyance impeller of Examples 13, 14 and 15 that do not contain a plasticizer to the vane members 20 for a paper sheet-conveyance impeller of Examples 2, 3 and 5 having different fineness and cycle of the core wire, it is understood that the tip decreasing rate of those decreases and restorability is improved.

It was understood from the above that according to Examples and Comparative Examples of the present invention, the vane member body of the vane member for a paper

TABLE 3

|  |  | Ex. 1 | Ex. 10 | Ex. 11 | Ex. 12 | Ex. 2 | Ex. 13 | Ex. 3 | Ex. 14 | Ex. 5 | Ex. 15 |
|---|---|---|---|---|---|---|---|---|---|---|---|
| Material of body |  | Polyurethane | | | | Polyurethane | | Polyurethane | | Polyurethane | |
| Material of core wire |  | Polyester | | | | Polyester | | Polyester | | Polyester | |
| Fineness of core wire (deniers) |  | 150 | | | | 100 | | 300 | | 150 | |
| Cycle of core wire (mm) |  | 0.3 | | | | 0.3 | | 0.3 | | 0.5 | |
| Amount of plasticizer added (part by mass) |  | 20 | 10 | 5 | 0 | 20 | 0 | 20 | 0 | 20 | 0 |
| Bending Durability | At bending of about 70,000 times | Presence of breakage | No | No | No | No | No | No | No | No | No | No |
|  |  | Presence of deformation | No | No | No | No | No | No | No | No | No | No |
|  | At bending of about 1,700,000 times | Presence of breakage | No | No | No | No | A | A | B | B | A | A |
|  |  | Presence of deformation | No | No | No | No | A | A | B | B | A | A |
|  | Judgement |  | ⊙ | ⊙ | ⊙ | ⊙ | ○ | ○ | ○ | ○ | ○ | ○ |
| Restorability | Vane member tip decreasing rate |  | 2.3% | 1.9% | 1.7% | 1.4% | 2.8% | 1.8% | 2.6% | 1.7% | 2.7% | 1.9% |

The test results of the restorability test for the vane members 20 for a paper sheet-conveyance impeller of Example 1 and Example 12 are shown in FIG. 6. Pass number shown in FIG. 6 is the number that the vane member 20 is brought into contact with a plain paper. In FIG. 6, an average value of four vane members was plotted as the vane member tip decreasing rate. As shown in FIG. 6, the vane member tip decreasing rate increases with increasing the pass number. This is due to that the vane member 20 that was straight at first curves in one direction and plastically deforms (bending-deforms) in an arch shape by abrasion of the tip of the vane member 20 and the bending-deformation gradually increases. The improvement of restoring force means an increase in the force returning to an original straight shape after bending-deformation. In other words, this means that the difference in the length of the vane member 20 before the restorability test and after the test decreases. Therefore, it is understood from the test results of the restorability test shown in FIG. 6 that the tip decreasing rate of the vane member 20 of Example 12 to which a plasticizer is not added is smaller than that of the vane member 20 of Example 1 to which a plasticizer was added. From the above, it could be confirmed that the restoring force was improved in the vane member 20 of Example 12 to which a plasticizer is not added than in the vane member 20 of Example 1.

sheet-conveyance impeller is that a thermosetting polyurethane elastomer is difficult to plastically deform and can increase bending durability as compared with a hydrogenated nitrile rubber (H-NBR). In the case where the vane member body of the vane member for a paper sheet-conveyance impeller includes a thermosetting polyurethane elastomer, the following facts were found. It was understood that in the case where the core wire of the vane member is not nylon fiber nor aramid fiber, but is polyester fiber, bending durability can be enhanced. It was further understood that in the case where the cycle of the core wire of the vane member is 0.25 mm, 0.3 mm or 0.5 mm, rather than 0.2 mm or 0.7 mm, plastic deformation is hard to occur and bending durability can be enhanced. It was further understood that in the case where the cycle of the core wire of the vane member is 0.25 mm or 0.3 mm, rather than 0.5 mm, plastic deformation is hard to occur and bending durability can be enhanced. It was further understood that in the case where the fineness of the core wire of the vane member is 100 deniers, 150 deniers or 300 deniers, rather than 90 deniers or 450 deniers, plastic deformation is hard to occur and bending durability can be enhanced. It was further understood that in the case where the fineness of the core wire of the vane member is 150 deniers, rather than 100 deniers or 300 deniers, plastic deformation is hard to occur and bending durability can be enhanced. It was further understood that the vane member body may contain a plasticizer in the thermosetting polyurethane elastomer, but the upper limit thereof is preferably 20 parts by mass per 100 parts by weight of the thermosetting polyurethane elastomer. It was further understood that in the case where the vane member body does not contain the plasticizer in the thermosetting polyurethane elastomer, restoring force is improved.

Therefore, it was understood that in the case where the vane member body is a thermosetting polyurethane elastomer containing no plasticizer and the core wire of the vane member is polyester fiber, the vane member for a paper sheet-conveyance impeller can suppress plastic deformation and enhance bending durability. It was further understood that to further enhance bending durability, the fineness of the core wire is in a range of 100 to 300 deniers (more preferably in a range of 120 to 180 deniers) and the cycle of the core wire is in a range of 0.25 to 0.50 mm (more preferably in a range of 0.25 to 0.30 mm).

This application is based on Japanese Patent Application No. 2016-232864 filed on Nov. 30, 2016 and Japanese Patent Application No. 2017-226925 filed on Nov. 27, 2017, the disclosures of which are incorporated herein by reference.

INDUSTRIAL APPLICABILITY

In the case where the present invention is used, a vane member for a paper sheet-conveyance impeller, in which plastic deformation is suppressed and bending durability is increased, can be provided.

DESCRIPTION OF REFERENCE NUMERALS AND SIGNS

1 Paper sheet-conveyance impeller
10 Cylindrical member
11 Rotating shaft
20 Vane member
21 Vane member body
25 Core wire
G Shaft direction of rotating shaft of cylindrical member

The invention claimed is:

1. A vane member for a paper sheet-conveyance impeller, which includes a rotatable cylindrical member, the vane member comprising:

a vane member body comprising a thermosetting polyurethane elastomer; and
a plurality of core wires being arranged side by side in a shaft direction of a rotating shaft of the cylindrical member and each comprising a polyester fiber,
wherein at least a part of each core wire is embedded inside the vane member body, and
wherein the core wires are arranged side by side in the shaft direction of the rotating shaft with an interval between the adjacent core wires being in a range of 0.25 to 0.50 mm.

2. The vane member for a paper sheet-conveyance impeller according to claim 1, wherein each core wire has a fineness in a range of 100 to 300 deniers.

3. The vane member for a paper sheet-conveyance impeller according to claim 1, wherein each core wire has a fineness in a range of 120 to 180 deniers.

4. The vane member for a paper sheet-conveyance impeller according to claim 1, wherein the vane member body comprises the thermosetting polyurethane elastomer comprising no plasticizer.

5. The vane member for a paper sheet-conveyance impeller according to claim 1, wherein the vane member body comprises the thermosetting polyurethane elastomer comprising a plasticizer, and an amount of the plasticizer is 20 parts by mass or less per 100 parts by weight of the thermosetting polyurethane elastomer.

6. The vane member for a paper sheet-conveyance impeller according to claim 1, wherein the core wires are arranged side by side in the shaft direction of the rotating shaft with the interval between the adjacent core wires being in a range of 0.25 to 0.30 mm.

7. The vane member for a paper sheet-conveyance impeller according to claim 1, wherein each core wire has a core wire diameter in a range of 0.10 to 0.19 mm.

8. The vane member for a paper sheet-conveyance impeller according to claim 1, wherein the vane member is arranged so as to protrude from an outer peripheral surface of the cylindrical member along a radial direction orthogonal to the shaft direction of the rotating shaft of the cylindrical member, and
the core wires are embedded along the radial direction of the rotating shaft of the cylindrical member.

9. The vane member for a paper sheet-conveyance impeller according to claim 1, wherein the vane member is arranged so as to protrude from an outer peripheral surface of the cylindrical member.

* * * * *